(12) United States Patent
Asaka et al.

(10) Patent No.: US 9,923,637 B2
(45) Date of Patent: Mar. 20, 2018

(54) BURST OPTICAL SIGNAL TRANSMISSION DEVICE AND CONTROL METHOD FOR BURST OPTICAL SIGNAL TRANSMISSION DEVICE

(71) Applicant: NIPPON TELEGRAPH AND TELEPHONE CORPORATION, Chiyoda-ku, Tokyo (JP)

(72) Inventors: Kota Asaka, Yokosuka (JP); Katsuhisa Taguchi, Yokosuka (JP); Hirotaka Nakamura, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 14/896,067

(22) PCT Filed: Jun. 24, 2014

(86) PCT No.: PCT/JP2014/066649
§ 371 (c)(1),
(2) Date: Dec. 4, 2015

(87) PCT Pub. No.: WO2014/208529
PCT Pub. Date: Dec. 31, 2014

(65) Prior Publication Data
US 2016/0127045 A1 May 5, 2016

(30) Foreign Application Priority Data
Jun. 27, 2013 (JP) .................. 2013-135450

(51) Int. Cl.
*H04B 10/04* (2006.01)
*H04B 10/516* (2013.01)
(Continued)

(52) U.S. Cl.
CPC ......... *H04B 10/516* (2013.01); *H04B 10/505* (2013.01); *H04B 10/564* (2013.01)

(58) Field of Classification Search
CPC .................... H04B 10/50575; H04B 10/50595
(Continued)

(56) References Cited

U.S. PATENT DOCUMENTS 3,780,296 A * 12/1973 Waksberg ............. G02F 1/0123
250/201.1
5,210,631 A * 5/1993 Huber .................... H04B 10/27
359/341.3
(Continued)

FOREIGN PATENT DOCUMENTS

CN 101895345 11/2010
JP 9-326771 A 12/1997
(Continued)

OTHER PUBLICATIONS

Nick Massa, Fiber Optical Telecommunication, 2000, University of Connecticut, pp. 326-327.*
(Continued)

*Primary Examiner* — David Payne
*Assistant Examiner* — Pranesh Barua
(74) *Attorney, Agent, or Firm* — Ohlandt, Greeley, Ruggiero & Perle, L.L.P.

(57) ABSTRACT

A bias point of an external modulator is set to different values according to on and off of a burst control signal and an optical source is driven continuously in a burst optical signal transmission device. The burst optical signal transmission device avoid generation of transient fluctuation of a wavelength and a light amount at the time of burst signal rising.

10 Claims, 10 Drawing Sheets

(51) Int. Cl.
*H04B 10/50* (2013.01)
*H04B 10/564* (2013.01)

(58) Field of Classification Search
USPC .................................................. 398/186, 195
See application file for complete search history.

(56) References Cited

U.S. PATENT DOCUMENTS

| | | | | |
|---|---|---|---|---|
| 6,282,216 | B1* | 8/2001 | Ikeuchi | H04B 10/564 372/29.01 |
| 6,583,910 | B1* | 6/2003 | Satoh | H04B 10/07955 359/239 |
| 6,592,272 | B1* | 7/2003 | Masucci | H04J 3/1694 398/100 |
| 7,245,413 | B2 | 7/2007 | Miura et al. | |
| 8,666,260 | B2* | 3/2014 | Khalouf | H04B 10/504 398/182 |
| 9,246,307 | B1* | 1/2016 | Yan | H01S 5/0612 |
| 9,479,255 | B2* | 10/2016 | Bowler | H04B 10/27 |
| 2001/0007508 | A1* | 7/2001 | Ooi | G02F 1/0123 359/245 |
| 2002/0171894 | A1* | 11/2002 | Sun | H04B 10/505 398/158 |
| 2003/0012244 | A1* | 1/2003 | Krasulick | B82Y 20/00 372/50.1 |
| 2004/0032646 | A1* | 2/2004 | Koren | H01S 5/5018 359/344 |
| 2004/0264978 | A1* | 12/2004 | Junginger | B82Y 20/00 398/186 |
| 2005/0128556 | A1* | 6/2005 | Jang | G02F 1/0123 359/239 |
| 2005/0244095 | A1* | 11/2005 | Ellison | G02B 6/4246 385/14 |
| 2005/0271099 | A1* | 12/2005 | Miremadi | H04B 10/504 372/38.02 |
| 2007/0070488 | A1* | 3/2007 | Miura | G02F 1/0123 359/245 |
| 2007/0177252 | A1* | 8/2007 | Kobayashi | H04B 10/501 359/321 |
| 2008/0107428 | A1* | 5/2008 | Abe | H04B 10/07957 398/187 |
| 2008/0130083 | A1* | 6/2008 | Yasuda | H04B 10/588 359/238 |
| 2009/0268766 | A1* | 10/2009 | Ishibashi | H01S 5/06832 372/38.02 |
| 2010/0040099 | A1* | 2/2010 | Blauvelt | H04B 10/564 372/31 |
| 2011/0008043 | A1* | 1/2011 | Nomura | H04Q 11/0066 398/45 |
| 2012/0039602 | A1* | 2/2012 | Hood | H04Q 11/0067 398/38 |
| 2012/0057876 | A1 | 3/2012 | Liu et al. | |
| 2012/0155880 | A1* | 6/2012 | Nishimoto | H04B 10/50572 398/79 |
| 2013/0223848 | A1* | 8/2013 | Yuda | H04B 10/40 398/135 |
| 2015/0188627 | A1* | 7/2015 | Yuda | H04B 10/502 398/30 |
| 2016/0218799 | A1* | 7/2016 | Ishikawa | H04B 10/0793 |

FOREIGN PATENT DOCUMENTS

| | | | |
|---|---|---|---|
| JP | 2003-134052 A | | 5/2003 |
| JP | 2007-94127 A | | 4/2007 |
| JP | 2007-201540 A | | 8/2007 |
| JP | 2007201540 A | * | 8/2007 |
| JP | 2011-226847 A | | 11/2011 |
| JP | 2013-511059 A | | 3/2013 |
| TW | 201310100 | | 3/2013 |

OTHER PUBLICATIONS

International Search Report dated Sep. 30, 2014 from corresponding PCT/JP2014/066649, 5 pages.

Kimura, S.; "WDM/TDM-PON Technologies for Future Flexible Optical Access Networks", 15th OptoElectronics and Communications Conference (OECC), Jul. 2010, pp. 14 and 15.

International Preliminary Report on Patentability dated Jan. 7, 2016 corresponding to International Patent Application No. PCT/JP2014/066649; 7 pages.

Chinese Office Action dated Sep. 22, 2017 from corresponding Chinese Patent Application 201480035921.X, 24 pages.

* cited by examiner

BURST OPTICAL SIGNAL TRANSMISSION DEVICE AND CONTROL METHOD FOR BURST OPTICAL SIGNAL TRANSMISSION DEVICE

CROSS-REFERENCE TO RELATED APPLICATIONS

The present application is claiming priority to Japanese Patent Application No. 2013-135450, filed Jun. 27, 2013.

BACKGROUND

1. Field of the Disclosure

The present disclosure relates to a burst optical signal transmission device which transmits a burst optical signal and the like its a control method.

2. Discussion of the Background Art

Recently, along with rapid popularization of the Internet, a large capacity, advanced, and economical optical access system has been required. Research of a passive optical network (PON) is underway as a method of realizing such a system. The PON is an economically advantageous optical access communication system in which a plurality of users can share a transmission path between a center device and an optical passive element by concentrating a plurality of transmission paths from a plurality of users to a unique transmission path by the optical passive element such as an optical power splitter. In Japan, an economical optical access communication system Gigabit Ethernet (TM)-PON (GE-PON) in which up to 32 users share 1 Gb/s class line capacity by time division multiplexing (TDM) is currently introduced. Research of a 10 Gb/s class 10G-EPON is underway as the next-generation optical access system capable of responding to needs of further large capacity, the system capable of realizing large capacity by an increased bit rate of an optical transmitter/receiver while using the part of transmission path which is the same path of the existing GE-PON.

FIG. 1 illustrates a configuration of a conventional burst optical signal transmission device for PON focusing only on a transmitting unit of a transceiver 1 mounted on an ONU (receiver unit and other peripheral circuits are not illustrated). FIG. 2 illustrates a time chart of a burst signal control method of the conventional burst optical signal transmission device for PON illustrated in FIG. 1. In FIG. 1, the conventional optical transmitter is mainly formed of a DML transmitter optical subassembly 2 (DML-TOSA) including a direct modulation LD 3 (DML: transmitter optical subassembly) such as a Fabry-Perot LD (FP-LD: laser diode) and a distributed-feedback LD (DFB-LD) and a burst supporting LD driving circuit 4. Burst signal light 0 transmitted from the transceiver 1 is generated in the following manner. Transmission signal data 5 transmitted from an upper layer (not illustrated) of the transceiver 1 is formed of an idle signal 52 and a data signal 51 (refer to FIG. 2). A burst control signal 6 also transmitted from the upper layer (not illustrated) generates the burst signal light by controlling on/off of the burst supporting LD driving circuit 4 according to transmission allowed time allocated to the ONU. Values of bias current ($I_b$) 61 and modulation current amplitude ($I_{pp}$) 62 supplied from the burst supporting LD driving circuit 4 to the DML-TOSA 2 through an LD signal line 7 are set according to on/off of the burst control signal 6. Meanwhile, the bias current 61 being a constant current value is 30 mA/0 mA at the time of on/off respectively in the conventional example illustrated in FIG. 2. The modulation current amplitude 62 being a current amplitude value on which high-speed intensity modulation at 1 Gb/s is performed is 40 mA/0 mA at the time of on/off respectively in the conventional example illustrated in FIG. 2. Thus, when the burst control signal 6 is turned off, LD driving current (bias current 61 and modulation current amplitude 62) is 0 mA and the optical signal is not transmitted. When the burst control signal 6 is turned on, the signal light on which intensity modulation at 1 Gb/s is performed is transmitted within a range from 10 mA to 50 mA according to the data signal 51 around the bias current 61 of 30 mA. In this manner, in the conventional burst optical signal transmission device for PON, it is possible to transmit the burst signal light only by controlling the LD driving current. It is required that the ONU does not transmit the optical signal or that optical intensity is not higher than a certain reference value outside the transmission allowed time in PON specification. The reference value is specified to be "lower than (minimum reception sensitivity of OLT receiver—10 dB)" (lower than approximately −40 dBm) in ITU-T standard G-PON and XG-PON1 and specified to be lower than −45 dBm in IEEE standard GE-PON and 10G-EPON, for example. The LD driving current can be set to 0 mA outside the transmission allowed time in the conventional burst optical signal transmission device for PON, so that this may sufficiently satisfy the specification.

In contrast, large capacity over 10 Gb/s class might be required depending on a service such as a high-definition image service, a higher bit rate of the transmitter/receiver (40 or 100 Gb/s class) causes a sharp increase in cost of the transmitter/receiver, so that there is a problem that a practical system cannot be obtained. A wavelength-variable WDM/TDM-PON obtained by combining the TDM and wavelength division multiplexing (WDM) in which wavelength variability is added to the optical transmitter/receiver such that the optical transmitters/receivers in a station side device can be gradually increased according to band requirement is reported as means of realizing economical large capacity (refer to Non Patent Literature 1, for example).

Non Patent Literature 1: S Kimura, "WDM/TDM-PON Technologies for Future Flexible Optical Access Networks", 15th OECC 2010, 6A1-1.

SUMMARY

Standardization of such system is currently underway as a 40 Gb/s class NG-PON2 (to be ITU-T G989 series) in ITU-T/FSAN, the system which economically realizes 40 Gb/s class by wavelength division multiplexing of the 10 Gb/s class devices of four different wavelengths. Currently, 1520-1540 nm is discussed as a dominant candidate in consideration of a required condition such as coexistence with an existing system as an upstream signal wavelength band. In contrast, the conventional PON such as the GE-PON and the 10G-EPON use a 1300 nm band as the upstream signal wavelength band and an inexpensive non temperature controlling DML can be applied as an upstream signal optical source. Although the DML has a problem of significant waveform distortion due to wavelength dispersion when the transmission is performed in a wavelength band in which the wavelength dispersion of an optical fiber is present, the 1300 nm band has substantially no wavelength dispersion of the optical fiber, so that this is advantageous in realizing the transmission distance of 20 km or longer. Furthermore, the DML also has a characteristic that the burst signal may be generated only by controlling the LD driving current. However, it is considered that 1520 to 1540 nm is likely to be used as the upstream wavelength band in the NG-PON2, so that only the transmission distance of 10 km or so is expected due to an effect of the dispersion in the DML. Furthermore, in the NG-PON2, WDM technology with four wavelengths and an optical frequency interval of approximately 200 GHz (1.6 nm) is used in addition to the conventional TDM. However, in the direct modulation LD on which a temperature controlling element (TEC) is not mounted, an oscillation wavelength changes at a ratio of approximately 0.1 nm/degrees C. according to change in case temperature of the transceiver, so that large crosstalk between wavelength channels occurs. Therefore, the DML without the TEC mounted cannot be applied to the NG-PON2.

Therefore, it is necessary to introduce an upstream signal transmitter of an external modulation system which is less affected by the dispersion with a constant oscillation wavelength regardless of the case temperature to the NG-PON2. As the optical source of the external modulation system, an EA-DFB-LD (EML) obtained by incorporating an electroabsorption semiconductor modulator (EAM) and the DFB-LD into one chip appears promising in a viewpoint of a small-size and cost saving. Since the TOSA (EML-TOSA) including the EML is developed for a WDM network, this is generally formed of an EML element, the TEC for controlling temperature, and other parts, so that the temperature is made constant (for example, 45 degrees C.) by a temperature controlling mechanism even when the case temperature of the transceiver changes and the oscillation wavelength shift does not occur.

However, when burst driving of such EML-TOSA is to be performed, two problems arise as follows. A first problem is LD optical intensity fluctuation and oscillation wavelength fluctuation. It is known that transient responsive fluctuation of a light output and a wavelength is observed at the time of burst signal rising when the burst driving of the bias current of the LD is performed (not only in the EML). Such fluctuation was not problematic in the conventional PON in which the WDM technology was not introduced, but this causes the crosstalk between the wavelength channels in the NG-PON2, so that this might deteriorate reception sensitivity of the receiver in the NG-PON2. In this manner, there is a practical problem in the burst driving of the EML-TOSA.

Other problems are unstable operation of a TEC control circuit. The EML-TOSA generally includes the TEC and a temperature monitoring element (thermister) and the TEC is always feed-back controlled by an automatic temperature controlling (ATC) circuit incorporated in the transceiver based on monitored temperature information. Incidentally, the bias current in the LD unit is 0 mA before the burst driving signal is applied to the LD unit of the EML, so that a heat generation amount in the LD unit is 0 mW. In contrast, when the burst driving signal is applied to the LD unit, the bias current becomes approximately 50 mA and an amount of heat is drastically added such that the heat generation amount becomes approximately 75 to 100 mW, so that the feedback control of the ATC circuit becomes unstable and the temperature of the EML fluctuates. As a result, the LD optical intensity and oscillation wavelength fluctuate. Therefore, the burst driving of the EML-TOSA has a practical problem as the same as the first problem.

The present disclosure is achieved in view of such problems and an object thereof is to provide the burst optical signal transmission device capable of resolving generation of transient fluctuation of the wavelength and a light amount at the time of burst signal rising and instability of temperature control due to heat generation of the optical source at the time of burst signal rising caused by the burst driving of the EML-TOSA and the control method for the same.

Solution to Problem

In the present disclosure, a bias point of external modulating means is set to different values according to on and off of a burst control signal in a burst optical signal transmission device.

Specifically, a burst optical signal transmission device according to the present disclosure is provided with an optical source which outputs continuous light, an external modulator which modulates the continuous light from the optical source based on a burst control signal indicating to output or stop transmission signal data and burst signal light to output the burst signal light, and an external modulator driving circuit which changes a bias level of the external modulator each time when the burst signal light is output and time when the burst signal light is stopped based on the burst control signal.

A control method for a burst optical signal transmission device according to the present disclosure is a control method for a burst optical signal transmission device provided with an optical source which outputs continuous light and an external modulator which modulates the continuous light from the optical source based on a burst control signal indicating to output or stop transmission signal data and burst signal light to output the burst signal light, the method which changes a bias level of the external modulator each time when the burst signal light is output and time when the burst signal light is stopped based on the burst control signal.

In the present disclosure, the external modulator can block or transmit the light from the optical source. Therefore, it is possible to continuously drive the optical source and avoid generation of transient fluctuation of a wavelength and a light amount at the time of burst signal rising. The present disclosure can resolve instability of temperature control because a heat generation amount of the optical source becomes constant due to the continuous driving of the optical source.

The present disclosure may provide the burst optical signal transmission device capable of resolving the generation of the transient fluctuation of the wavelength and light amount at the time of burst signal rising and the instability of the temperature control due to heat generation of the optical source at the time of burst signal rising caused by burst driving of an EML-TOSA and the control method for the same.

The optical source of the burst optical signal transmission device according to the present disclosure continuously outputs the continuous light of the same intensity.

The burst optical signal transmission device according to the present disclosure is further provided with an optical source driving circuit which changes the intensity of the continuous light output from the optical source each time when the burst signal light is output and the time when the burst signal light is stopped based on the burst control signal.

The control method for the burst optical signal transmission device according to the present disclosure changes the intensity of the continuous light output from the optical source each time when the burst signal light is output and the time when the burst signal light is stopped based on the burst control signal.

It is possible to decrease power consumption by decreasing the optical intensity of the optical source when the burst signal is stopped without making the same constant.

The external modulator of the burst optical signal transmission device according to the present disclosure is an electroabsorption semiconductor modulator, a semiconductor Mach-Zehnder modulator, or a lithium niobate modulator, and the optical source is a distributed-feedback semiconductor laser or a wavelength-variable laser.

The external modulator of the burst optical signal transmission device according to the present disclosure is the electroabsorption semiconductor modulator, and the external modulator driving circuit sets reverse bias voltage of the electroabsorption optical semiconductor modulator when the burst control signal indicates to stop the burst signal light to a value higher than the reverse bias voltage of the electroabsorption optical semiconductor modulator when the burst control signal indicates to output the burst signal light.

In the burst optical signal transmission device according to the present disclosure, the optical source driving circuit sets the intensity of the continuous light from the optical source when the burst control signal indicates to stop the burst signal light to a value lower than the intensity of the continuous light from the optical source when the burst control signal indicates to output the burst signal light, the external modulator is the electroabsorption semiconductor modulator, and the external modulator driving circuit sets the reverse bias voltage of the electroabsorption optical semiconductor modulator when the burst control signal indicates to stop the burst signal light to a value higher than the reverse bias voltage of the electroabsorption optical semiconductor modulator when the burst control signal indicates to output the burst signal light.

Advantageous Effects of Disclosure

The present disclosure may provide the burst optical signal transmitting device capable of resolving the generation of the transient fluctuation of the wavelength and light amount at the time of burst signal rising and the instability of the temperature control due to heat generation of the optical source at the time of burst signal rising caused by burst driving of an EML-TOSA and the method of controlling the same.

DETAILED DESCRIPTION OF THE PREFERRED EMBODIMENT

Embodiments of the present disclosure are hereinafter described in detail with reference to the drawings. Meanwhile, the present disclosure is not limited to the embodiments hereinafter described. The embodiments are for exemplification only and the present disclosure may be carried out in modes with various changes and modifications based on the knowledge of one skilled in the art. Meanwhile, the components with the same reference sign in this specification and the drawings are the same component.

First Embodiment

A burst optical signal transmission device of this embodiment is provided with an optical source which outputs continuous light, an external modulator which modulates the continuous light from the optical source based on a burst control signal indicating to output or stop transmission signal data and burst signal light to output the burst signal light, and an external modulator driving circuit which changes a bias level of the external modulator each time when the burst signal light is output and time when the burst signal light is stopped based on the burst control signal.

The optical source continuously outputs the continuous light of the same intensity.

Figure 3:
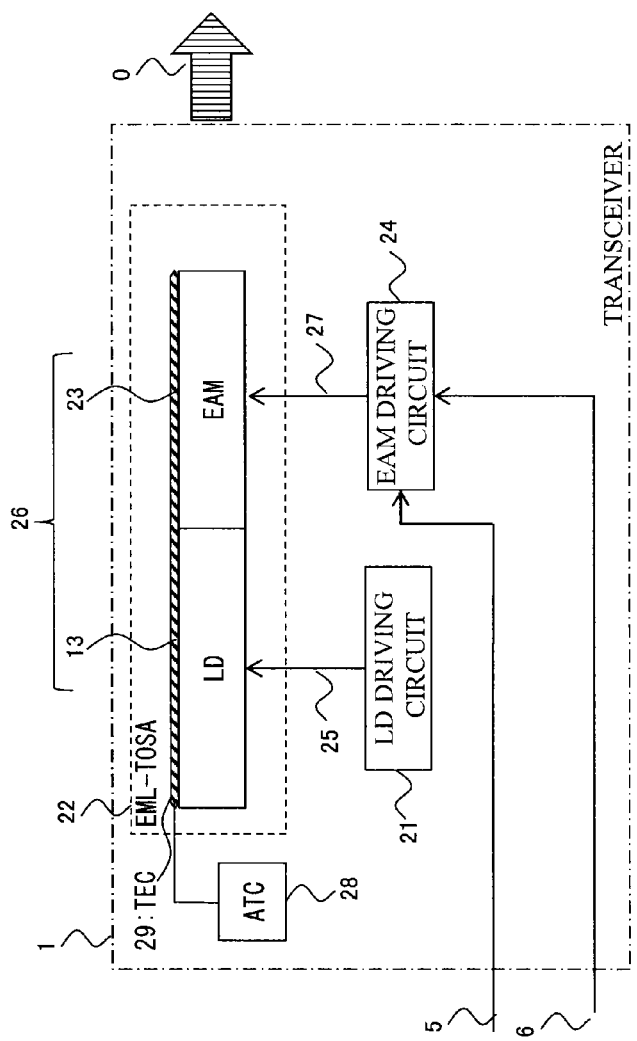
FIG. 3 is a view illustrating a burst signal light transmission device according to the present disclosure.
Figure 4:
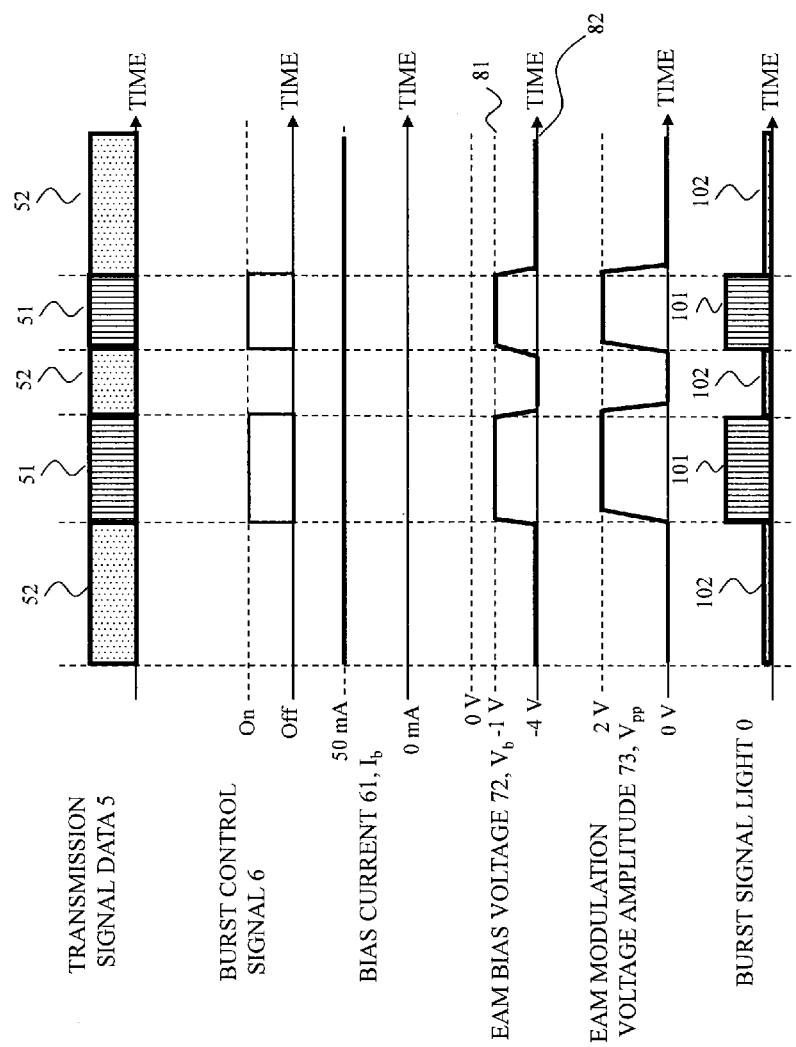
FIG. 4 is a time chart illustrating a control method for the burst signal light transmission device according to the present disclosure.

Hereinafter, a control method for a 10 Gb/s class external modulator type burst optical signal transmission device for ONU of this embodiment is described in detail with reference to FIGS. 3 to 7. FIG. 3 illustrates a configuration of a burst optical signal transmission device for PON of this embodiment focusing only on a transmitting function of a transceiver 1 mounted on the ONU (receiving function and other peripheral circuits are not illustrated). FIG. 4 illustrates a time chart of the control method for the 10 Gb/s class external modulator type burst optical signal transmission device of this embodiment.

In FIG. 3, the burst optical signal transmission device is mainly formed of an EML-TOSA 22 including an EML 26 (DFB-LD 13 and EAM 23), an LD driving circuit 21, and a burst supporting EAM driving circuit 24. The EML-TOSA 22 controls temperature of the DFB-LD 13 by an automatic temperature controlling circuit (ATC) 28 and a temperature controlling element (TEC) 29. The optical source, external modulator, and external modulator driving circuit correspond to the DFB-LD 13, EAM 23, and EAM driving circuit 24, respectively.

Burst signal light 0 transmitted from the transceiver 1 is generated in the following manner. Transmission signal data 5 having a 10 Gb/s class signal speed transmitted from an upper layer (not illustrated) is input to the transceiver 1. The transmission signal data 5 is formed of an idle signal 52 and a data signal 51 in which the data signal 51 is an upstream signal which the transceiver 1 for ONU should transmit to an OLT. Furthermore, a burst control signal 6 is input to the transceiver 1. The burst control signal 6 indicates transmission timing of the data signal 51 by a control signal indicating on/off. The upper layer controls according to transmission allowed time allocated to the ONU by using the burst control signal 6 (refer to FIG. 4).

The DFB-LD 13 to which a constant current value 50 mA is applied from the LD driving circuit 21 through an LD bias line 25 as bias current ($I_b$) 61 always oscillates continuous laser light, and the laser light enters the EAM 23 on a subsequent stage. Similarly, the burst control signal 6 transmitted from the upper layer (not illustrated) is applied from the burst supporting EAM driving circuit 24 to the EAM 23 through an EAM signal line 27. The EAM 23 controls EAM bias voltage ($V_b$) 72 and EAM modulation voltage amplitude ($V_{pp}$) 73 according to on/off of the burst control signal 6 to perform intensity modulation on the laser light entering the EAM 23 to convert the same to the burst signal light 0 and emits the same from the transceiver 1.

Figure 5:
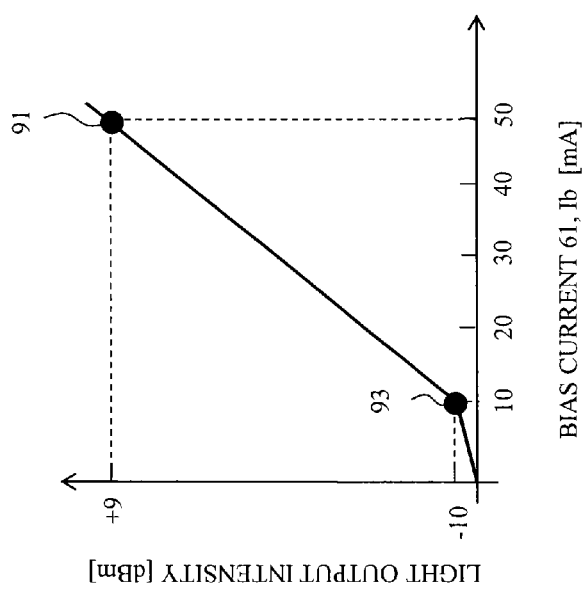
FIG. 5 is a view illustrating bias current dependency of EML light output intensity of the burst signal light transmission device according to the present disclosure.
Figure 6:
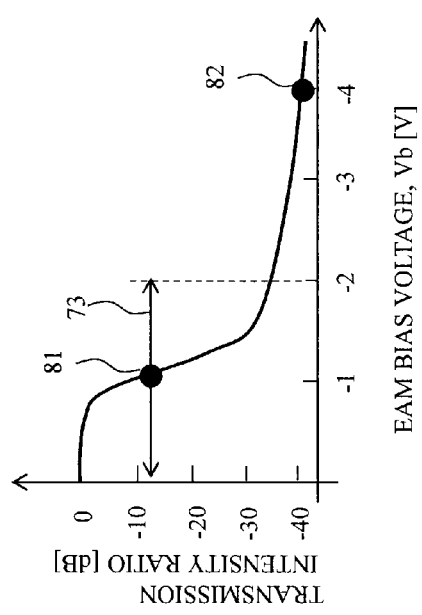
FIG. 6 is a view illustrating bias voltage dependency of an EAM transmission intensity ratio of the burst signal light transmission device according to the present disclosure.

The EAM driving circuit 24 sets a value of the EAM bias voltage 72 to −4 V and sets a value of the EAM modulation voltage amplitude 73 to 0 V when the burst control signal 6 is turned off as illustrated in FIG. 4. EML light output intensity at that time is described in detail with reference to FIGS. 5 and 6. FIG. 5 illustrates bias current dependency of the EML light output intensity in this embodiment. Specifically, FIG. 5 illustrates a measured result of the EML light output intensity when the bias current 61 is changed from 0 mA to 50 mA while the values of the EAM bias voltage 72 and EAM modulation voltage amplitude 73 of the EML 26 are set to 0 V. FIG. 6 illustrates bias voltage dependency of an EAM transmission intensity ratio of this embodiment. As illustrated in FIG. 6, when both values of the EAM bias voltage 72 and EAM modulation voltage amplitude 73 are set to 0 V, the transmission intensity ratio in the EAM is 0 dB. Therefore, a quenching phenomenon by an electroabsorption effect does not occur in the EAM 23 and the optical signal output from the EAM 23 has optical intensity of +9 dBm when the bias current 61 is 50 mA (LD bias point 91) as illustrated in FIG. 5.

In contrast, the EAM driving circuit 24 sets the bias current 61 to same 50 mA (LD bias point 91), sets the value of the EAM bias voltage 72 to −4 V (EAM bias point 82 in FIG. 6), and sets the value of the EAM modulation voltage amplitude 73 to 0 V when the burst control signal 6 is turned off. Therefore, the quenching phenomenon of −40 dB occurs in the EAM 23 due to a quenching characteristic illustrated in FIG. 6 and the light output intensity of the EML-TOSA 22, that is to say, intensity of the idle optical signal 102 in the burst signal light 0 becomes −32 dBm (refer to FIG. 7). This value is sufficiently lower than a minimum light reception sensitivity of approximately −30 dBm of a 10 Gb/s class Avalanche photo diode (APD) used as a receiver, so that a quenching level is practically sufficient.

Figure 7:
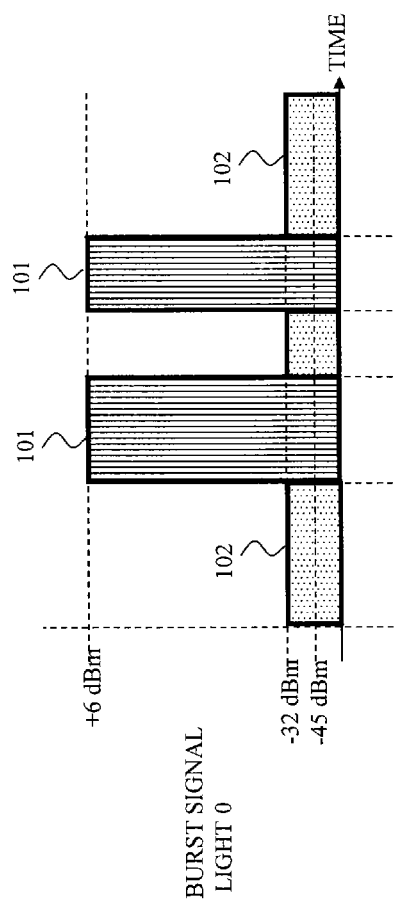
FIG. 7 is a view illustrating burst signal light output by the burst signal light transmission device according to the present disclosure.

The EAM driving circuit 24 sets the bias current 61 to 50 mA (LD bias point 91 in FIG. 5), sets the value of the EAM bias voltage 72 to −1 V (EAM bias point 81 in FIG. 6), and sets the value of the EAM modulation voltage amplitude 73 to 2 V when the burst control signal 6 is turned on. Therefore, the EML-TOSA 22 performs the intensity modulation on the laser light entering the EAM 23 to generate data optical signal 101 as the burst signal light 0. The light output intensity at that time is +6 dBm due to an effect of a modulation loss of approximately 3 dB of the EAM. Comparison of the optical intensity of the data optical signal 101 and the idle signal 102 of the burst optical signal 0 is illustrated in FIG. 7. Meanwhile, FIG. 7 comprehensively and clearly illustrates the optical intensity comparison of the burst optical signal 0 in FIG. 4 and illustrates the same burst optical signal 0.

The greatest characteristic of the control method of this embodiment is that the DFB-LD 13 is driven in a continuously oscillating state with a constant bias current 61 regardless of the burst control signal 6 and the EAM bias voltage 72 of the EAM 23 is changed from −1 V (when the burst control signal 6 is turned on) to −4 V (when the burst control signal 6 is turned off) according to the burst control signal 6, and according to this, the burst optical signal is generated, and that the light output intensity outside the transmission allowed time of the ONU is made equal to or lower than the minimum reception sensitivity of an OLT receiver.

The method is also characterized in that the DFB-LD 13 is driven at the constant bias current 61 of 50 mA without burst driving, such that the LD driving circuit with a simple circuit configuration may be applied and transient responsive fluctuation of the light output and wavelength at the time of rising of the burst optical signal may be inhibited, and that stable feedback control of the ATC circuit may be realized.

As a result, there is an effect of securing a transmission distance of 20 km or longer without an effect of dispersion and inhibiting channel crosstalk between wavelengths to avoid interference with other ONUs also in a wavelength division multiplexed PON in a C band by using the control method of this embodiment.

Meanwhile, although a 10 Gb/s class modulation speed is used in this embodiment, the control method of this embodiment may also be applied to the modulation speed other than 10 Gb/s (for example, 1 Gb/s, 25 Gb/s, or 40 Gb/s). Although an EML external modulator integrated optical source is used in this embodiment, it is obvious that a similar effect may be obtained also by using the external modulator integrated optical source of a mode in which a semiconductor MZM (Mach-Zehnder modulator) and the DFB-LD are integrated. The optical source is not limited to the DFB-LD and it is obvious that the similar effect may be obtained also by using a wavelength-variable laser. Furthermore, it is obvious that this may also be applied to an external modulator type optical source in which an EAM or MZM external modulator module (semiconductor MZM or LN modulator) and a DFB-LD module are individual modules connected by optical connecting means such as an optical fiber.

Second Embodiment

A burst optical signal transmission device of this embodiment is further provided with an optical source driving circuit which changes intensity of continuous light output from an optical source each time when burst signal light is output and time when the burst signal light is stopped based on a burst control signal.

Figure 8:
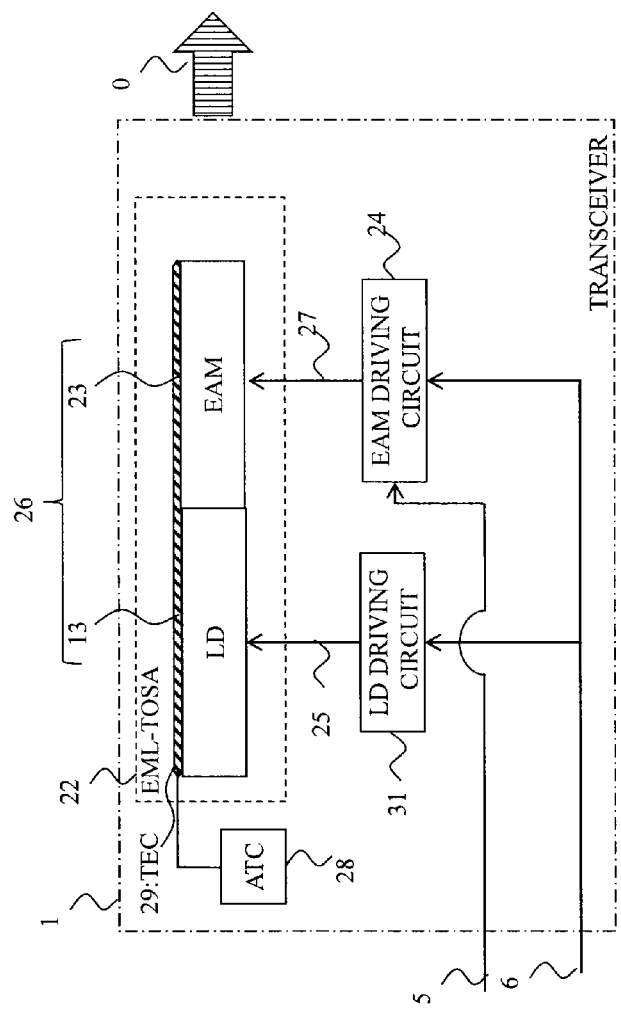
FIG. 8 is a view illustrating the burst signal light transmission device according to the present disclosure.
Figure 9:
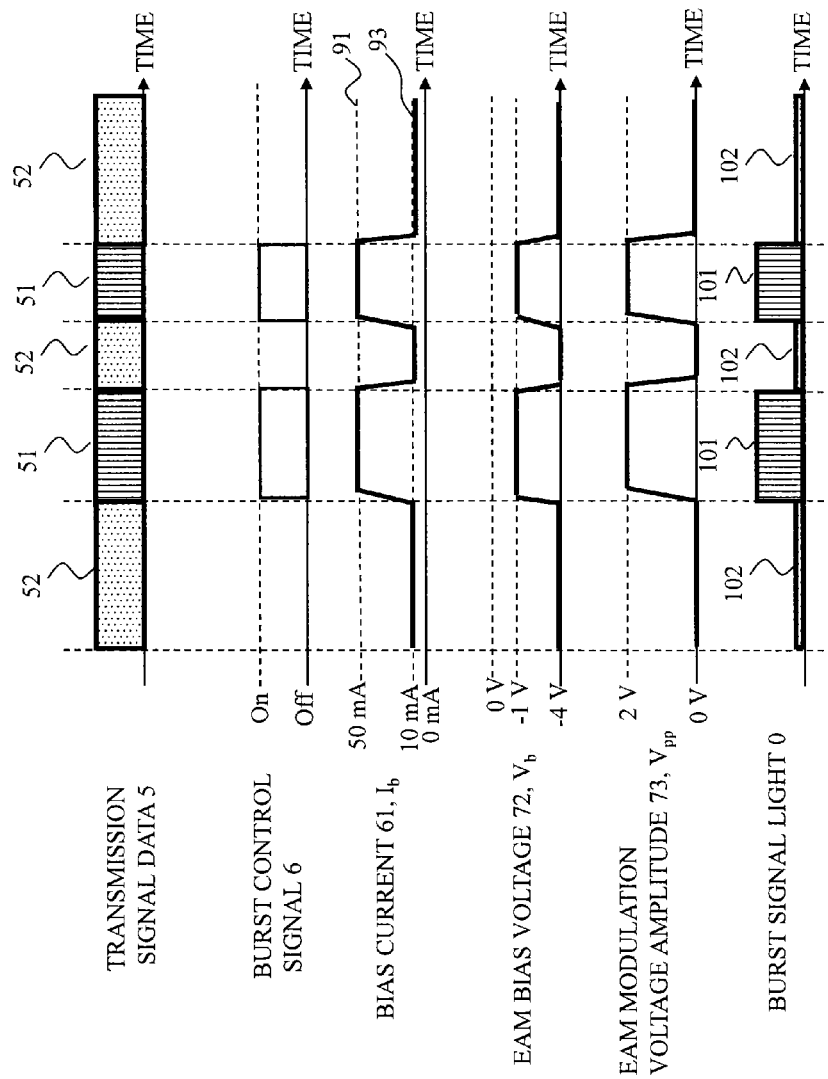
FIG. 9 is a time chart illustrating the control method for the burst signal light transmission device according to the present disclosure.
Figure 10:
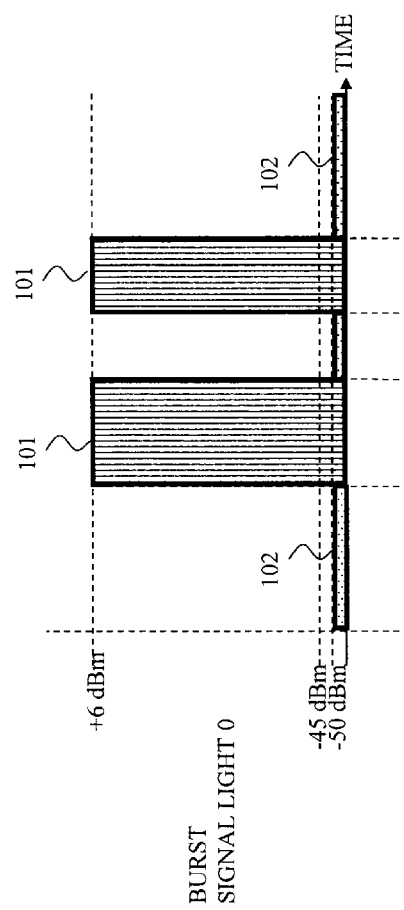
FIG. 10 is a view illustrating the burst signal light output by the burst signal light transmission device according to the present disclosure.

A control method for a 10 Gb/s class external modulator type burst optical signal transmission device for ONU of this embodiment is hereinafter described in detail with reference to FIGS. 8 to 10. FIG. 8 illustrates a configuration of a burst optical signal transmission device for PON of this embodiment focusing only on a transmitting function of a transceiver 1 mounted on the ONU (receiving function and other peripheral circuits are not illustrated). FIG. 9 illustrates a time chart of the control method for the 10 Gb/s class external modulator type burst optical signal transmission device of this embodiment.

In FIG. 8, the burst optical signal transmission device is mainly formed of an EML-TOSA 22 including an EML (DFB-LD 13 and EAM 23), a burst supporting LD driving circuit 31, and a burst supporting EAM driving circuit 24. The configuration of the burst optical signal transmission device for PON of the first embodiment illustrated in FIG. 3 and the configuration of this embodiment illustrated in FIG. 8 are the same except existence of the burst supporting LD driving circuit 31 as the LD driving circuit in this embodiment.

Burst signal light 0 transmitted from the transceiver 1 is generated in the following manner. Transmission signal data 5 and a burst control signal 6 are input from an upper layer (not illustrated) to the transceiver 1 as the same manner as in the first embodiment (refer to FIG. 9).

Different values of bias current ($I_b$) 61 according to on/off of the burst control signal 6 are applied from the burst supporting LD driving circuit 31 to the DFB-LD 13 through an LD bias line 25. The value of the bias current 61 of the DFB-LD 13 is constant regardless of on/off of the burst control signal in the first embodiment, and this embodiment is different from the first embodiment in this point. Laser light emitted from the DFB-LD 13 enters the EAM 23 on a subsequent stage. The EAM 23 controls EAM bias voltage ($V_b$) 72 and EAM modulation amplitude voltage ($V_{pp}$) 73 according to on/off of the burst control signal 6, thereby performing intensity modulation on the laser light entering the EAM 23 to convert the same to the burst signal light 0 and emits the same from the transceiver 1.

As illustrated in FIG. 9, the EAM driving circuit 24 sets the value of the bias current 61 of the EML 26 to 10 mA being an oscillation threshold current value, sets a value of the EAM bias voltage 72 to −4 V, and sets a value of the EAM modulation voltage amplitude 73 to 0 V when the burst control signal 6 is turned off. At that time, as illustrated in FIG. 5, in the EAM driving circuit 24, light output intensity of the DFB-LD 13 is −10 dBm when the bias current 61 is 10 mA (bias point 93). As illustrated in FIG. 6, the EAM driving circuit 24 sets the value of the EAM bias voltage 72 to −4 V (EAM bias point 82) and sets the value of the EAM modulation voltage amplitude 73 to 0 V, so that quenching of −40 dB occurs in the EAM 23. Therefore, the intensity of light output by the EML 26, that is to say, the intensity of an idle optical signal 102 in the burst signal light 0 is −50 dBm (refer to FIG. 7). The value is remarkably lower than the minimum light reception sensitivity of approximately −30 dBm of an APD used as a receiver and is sufficiently lower than ITU-T and IEEE specification (−40 dBm and −45 dBm), so that if an NG-PON2 adopts the existing specification as is, this specification is satisfied.

In contrast, the EAM driving circuit 24 sets the bias current 61 to 50 mA (LD bias point 91 in FIG. 5), sets the value of the EAM bias voltage 72 to −1 V (EAM bias point 81 in FIG. 6), and sets the value of the EAM modulation voltage amplitude 73 to 2 V when the burst control signal 6 is turned on. Therefore, the EML-TOSA 22 performs the intensity modulation on the laser light entering the EAM 23 to generate data optical signal 101 as the burst signal light 0. The light output intensity at that time is +6 dBm due to an effect of a modulation loss of approximately 3 dB of the EAM. Comparison of the optical intensity of the data optical signal 101 and the idle signal 102 of the burst optical signal 0 is illustrated in FIG. 10. Meanwhile, FIG. 10 comprehensively and clearly illustrates the optical intensity comparison of the burst optical signal 0 in FIG. 9 and illustrates the same burst optical signal 0.

The greatest characteristic of the control method of this embodiment is that the bias current 61 and the EAM bias voltage 72 of the EML 26 are changed from 50 mA and −1 V (when burst control signal 6 is turned on) to 10 mA and −4 V (when burst control signal 6 is turned off), respectively, according to the burst control signal 6, and according to this, the burst optical signal is generated, and that the light output intensity outside transmission allowed time of the ONU is made equal to or lower than an existing PON specified value. This is widely different from the control method of the first embodiment in that the value of the bias current 61 is set to the different values according to the burst control signal 6.

When the burst control signal 6 is turned off, the bias current value 61 is decreased to 10 mA and the light output intensity of the DFB-LD 13 is decreased to −10 dBm, and according to this, it is realized that the light output intensity outside the transmission allowed time of the ONU is decreased to −50 dBm (−32 dBm in the first embodiment).

Figure 1:
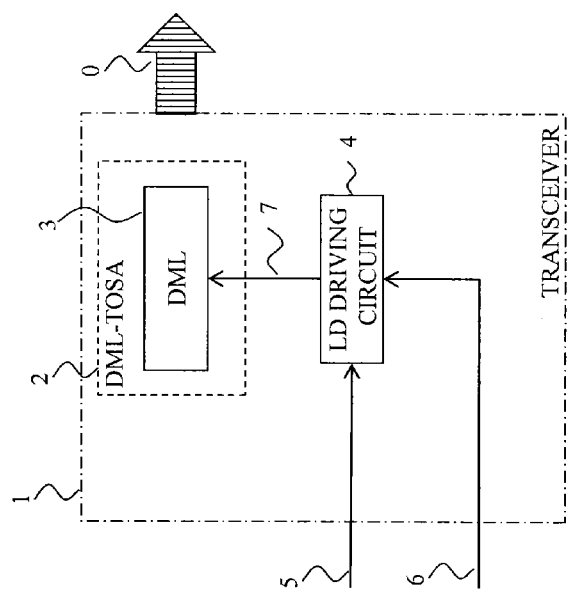
FIG. 1 is a view illustrating a burst optical signal transmission device for PON.
Figure 2:
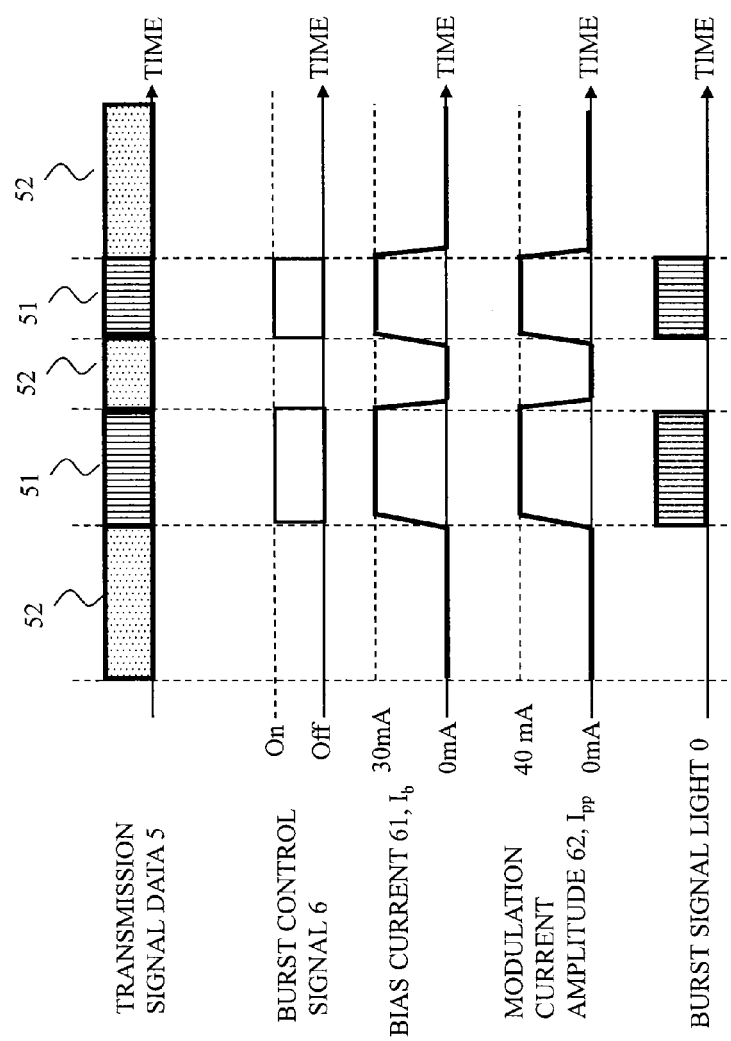
FIG. 2 is a time chart illustrating a burst signal control method of the burst optical signal transmission device for PON.

In contrast, as compared to the configuration of the first embodiment, it is required to introduce the burst supporting LD driving circuit 31, so that a circuit configuration is slightly complicated. Since the bias current value 61 is drastically changed from 10 mA to 50 mA at the time of burst on, an effect of inhibiting transient responsive fluctuation of the light output and wavelength and an effect of realizing stable feedback control of the ATC circuit are smaller than those of the first embodiment in which it is driven at constant 50 mA regardless of on/off of the burst control signal 6. However, it is possible to avoid complete turning off of the DFB-LD 13 (bias current 61 is set to 0) also at the time of burst off. Therefore, this embodiment has a characteristic that the effect of inhibiting the transient responsive fluctuation of the light output and wavelength is larger than that when the DML 3 is burst driven in FIG. 1.

From above, there is an effect of securing a transmission distance of 20 km or longer without an effect of dispersion and of inhibiting channel crosstalk between wavelengths to avoid interference with other ONUs also in a wavelength division multiplexed PON in a C band by using the control method of this embodiment.

Meanwhile, although a 10 G/bs class modulation speed is used in this embodiment, the controlling method of this embodiment may also be applied to the modulation speed other than 10 Gb/s (for example, 1 Gb/s, 25 Gb/s, or 40 Gb/s and so on). Although an EML external modulator integrated optical source is used in this embodiment, it is obvious that a similar effect may be obtained also by using the external modulator integrated optical source of a mode in which a semiconductor MZM (Mach-Zehnder modulator) and the DFB-LD are integrated. The optical source is not limited to the DFB-LD and it is obvious that the similar effect may be obtained also by using a wavelength-variable laser. Furthermore, it is obvious that this may also be applied to an external modulator type optical source in which an EAM or MZM external modulator module (semiconductor MZM or LN modulator) and a DFB-LD module are individual modules connected by optical connecting means such as an optical fiber.

[Additional Note]

A control method for an external modulator type burst optical signal transmission device according to the present disclosure is hereinafter described.

Problem

Conventionally, an EML-TOSA typically incorporates a TEC and a thermister and the TEC is always feedback-controlled by an ATC circuit incorporated in a transceiver based on monitored temperature information. However, when the EML-TOSA is applied to upstream communication of a WDM/TDM-PON system, the feedback control of the ATC circuit becomes unstable by a burst driving signal and temperature of the EML fluctuates, so that LD optical intensity and an oscillation wavelength problematically fluctuate accordingly.

(1):

A control method for a burst optical signal transmission device provided with external modulating means and laser light oscillating means, comprising a mechanism which sets a bias control level of the external modulating means to different values according to on and off of a burst control signal.

(2):

The control method for the burst optical signal transmission device according to (1) described above, comprising: a mechanism which sets output light intensity of the laser light oscillating means to different values according to on and off of the burst control signal.

(3):

The control method for the burst optical signal transmission device according to (1) and (2) described above, wherein an electroabsorption semiconductor modulator or a semiconductor Mach-Zehnder modulator or a lithium niobate modulator is used as the external modulating means, and a distributed-feedback semiconductor laser or a wavelength-variable laser is used as the laser light oscillating means.

(4):

The control method for the burst optical signal transmission device according to (1) to (3) described above, comprising: a mechanism which sets reverse bias voltage of the electroabsorption optical semiconductor modulator to a higher value when the burst control signal is turned off than when the burst control signal is turned on.

(5):

The control method for the burst optical signal transmission device according to (2) and (3) described above, comprising: a mechanism which sets light output light intensity of the laser light oscillating means to a lower value when the burst control signal is turned off than when the burst control signal is turned on; and a mechanism which sets reverse bias voltage of the electroabsorption optical semiconductor modulator to a higher value when the burst control signal is turned off than when the burst control signal is turned on.

Effects of Disclosure

It is possible to provide a control method for an external modulator type burst optical signal transmission device which may realize long distance transmission not shorter than 20 km with less distortion of an optical signal waveform by wavelength dispersion also in a C band and a sufficient quenching level outside upstream signal transmission allowed time of an ONU by using the technology of the present disclosure.

REFERENCE SIGNS LIST

0: burst signal light
1: transceiver
2: DML TOSA
3: DML
4: burst supporting LD driving circuit
5: transmission signal data
6: burst control signal
7: LD signal line
13: DFB-LD
21: LD driving circuit
22: EML TOSA
23: EAM
24: burst supporting EAM driving circuit
25: LD bias line
26: EML (DFB-LD 13 and EAM 23)
27: EAM signal line
28: ATC
29: TEC
31: burst supporting LD driving circuit
51: data signal
52: idle signal
61: bias current
62: modulation current amplitude
72: EAM bias voltage
73: EAM modulation voltage amplitude
81: EAM bias point A (when burst control signal is turned on)
82: EAM bias point B (when burst control signal is turned off)
91: LD bias point A
93: LD bias point C
101: data optical signal
102: idle optical signal

The invention claimed is:

1. A burst optical signal transmission device comprising:
an optical source which outputs continuous light;
an external modulator which modulates the continuous light from the optical source based on a burst control signal indicating to output or stop transmission signal data and burst signal light to output the burst signal light; and
an external modulator driving circuit which changes a bias level of the external modulator each time when the burst signal light is output and time when the burst signal light is stopped based on the burst control signal,
wherein the external modulator is an electroabsorption semiconductor modulator,
the external modulator driving circuit inputs, to the external modulator, a bias voltage and a modulation voltage amplitude that enables modulation of the continuous light from the optical source and output of the burst signal light when the burst control signal indicates to output the burst signal light and, when the burst control signal indicates to stop the burst signal light, inputs, to the external modulator, a bias voltage and a modulation voltage amplitude that reduces light intensity of the continuous light from the optical source that is transmitted by the external modulator such that the light intensity becomes smaller than light intensity of the burst signal light output from the external modulator when the burst control signal indicates to output the burst signal light, and
the external modulator driving circuit sets reverse bias voltage of the electroabsorption optical semiconductor modulator when the burst control signal indicates to stop the burst signal light to a value higher than the reverse bias voltage of the electroabsorption optical semiconductor modulator when the burst control signal indicates to output the burst signal light.

2. The burst optical signal transmission device according to claim 1, wherein the burst control signal is a control signal based on transmission allowed time within which it is possible to output the burst signal light allocated by an upper layer.

3. The burst optical signal transmission device according to claim 1, wherein the optical source continuously outputs the continuous light of the same intensity.

4. The burst optical signal transmission device according to claim 1, further comprising:
an optical source driving circuit which changes intensity of the continuous light output from the optical source such that intensity of the continuous light output from the optical source each time when the burst signal light is output is larger than intensity of the continuous light output from the optical source each time when the burst signal light is stopped based on the burst control signal.

5. The burst optical signal transmission device according to claim 1, wherein
the optical source driving circuit sets intensity of the continuous light from the optical source when the burst control signal indicates to stop the burst signal light to a value lower than the intensity of the continuous light from the optical source when the burst control signal indicates to output the burst signal light.

6. A control method for a burst optical signal transmission device provided with an optical source which outputs continuous light and
an external modulator which modulates the continuous light from the optical source based on a burst control signal indicating to output or stop transmission signal data and burst signal light to output the burst signal light,
the control method for the burst optical signal transmission device which changes a bias level of the external modulator each time when the burst signal light is output and time when the burst signal light is stopped based on the burst control signal,
wherein the external modulator is an electroabsorption semiconductor modulator,
the external modulator driving circuit inputs, to the external modulator, a bias voltage and a modulation voltage amplitude that enables modulation of the continuous light from the optical source and output of the burst signal light when the burst control signal indicates to output the burst signal light and, when the burst control signal indicates to stop the burst signal light, inputs, to the external modulator, a bias voltage and a modulation voltage amplitude that reduces light intensity of the continuous light from the optical source that is transmitted by the external modulator such that the light intensity becomes smaller than light intensity of the burst signal light output from the external modulator when the burst control signal indicates to output the burst signal light, and
the external modulator driving circuit sets reverse bias voltage of the electroabsorption optical semiconductor modulator when the burst control signal indicates to stop the burst signal light to a value higher than the reverse bias voltage of the electroabsorption optical semiconductor modulator when the burst control signal indicates to output the burst signal light.

7. The control method for the burst optical signal transmission device according to claim 6, wherein the burst control signal is a control signal based on transmission allowed time within which it is possible to output the burst signal light allocated by an upper layer.

8. The control method for the burst optical signal transmission device according to claim 6, the method which allows the optical source to continuously output the continuous light of the same intensity.

9. The control method for the burst optical signal transmission device according to claim 6, the method which changes intensity of the continuous light output from the optical source such that intensity of the continuous light output from the optical source each time when the burst signal light is output is larger than intensity of the continuous light output from the optical source each time when the burst signal light is stopped based on the burst control signal.

10. The control method for the burst optical signal transmission device according to claim 6, which sets intensity of the continuous light from the optical source when the burst control signal indicates to stop the burst signal light to a value lower than the intensity of the continuous light from the optical source when the burst control signal indicates to output the burst signal light.

* * * * *